(12) United States Patent
Witzig

(10) Patent No.: US 6,759,823 B2
(45) Date of Patent: Jul. 6, 2004

(54) FAIL-SAFE MECHANISM FOR DC-DRIVE

(75) Inventor: Harald Witzig, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 09/980,691

(22) PCT Filed: Feb. 16, 2001

(86) PCT No.: PCT/DE01/00592

§ 371 (c)(1),
(2), (4) Date: Mar. 20, 2002

(87) PCT Pub. No.: WO01/65666

PCT Pub. Date: Sep. 7, 2001

(65) Prior Publication Data

US 2002/0105239 A1 Aug. 8, 2002

(30) Foreign Application Priority Data

Mar. 1, 2000 (DE) .......................... 100 09 781
Jan. 3, 2001 (DE) .......................... 101 00 159

(51) Int. Cl.⁷ .............................................. H02H 7/085
(52) U.S. Cl. ..................... 318/434; 318/496; 361/31
(58) Field of Search ................................ 318/434, 494, 318/496; 388/903; 361/23, 24, 25, 30, 31, 33

(56) References Cited

U.S. PATENT DOCUMENTS

| | | | | |
|---|---|---|---|---|
| 4,511,827 A | * | 4/1985 | Morinaga et al. ........... | 318/254 |
| 4,806,839 A | * | 2/1989 | Nagato et al. .............. | 318/798 |
| 4,833,387 A |   | 5/1989 | Pfeiffer | |
| 6,297,573 B1 | * | 10/2001 | Roth-Stielow et al. .... | 310/68 C |
| 6,492,799 B1 | * | 12/2002 | Rajala et al. ................. | 324/86 |

FOREIGN PATENT DOCUMENTS

| | | |
|---|---|---|
| DE | 37 09 168 | 9/1987 |
| DE | 42 09 167 | 9/1993 |
| DE | 44 06 730 | 9/1995 |
| EP | 0 508 250 | 10/1992 |
| GB | 743 765 | 1/1956 |
| JP | 10 075596 | 3/1998 |
| JP | 05 199712 | 8/1998 |
| WO | WO 98 10971 | 3/1998 |

OTHER PUBLICATIONS

Patent Abstracts of Japan, vol. 017, No. 630 (E–1463), Nov. 22, 1993*.
Patent Abstracts of Japan, vol. 1998, No. 08, Jun. 30, 1998*.

* cited by examiner

Primary Examiner—Bentsu Ro
(74) Attorney, Agent, or Firm—Kenyon & Kenyon

(57) ABSTRACT

A brushless d.c. drive including a synchronous motor, including a multiphase armature winding, a switching device controlled by an electronic controller and connected upstream from the armature winding for commutation of the armature winding, and a device for generating a fail-silent response with simple circuitry measures and without any external components, and which includes a separating apparatus, arrangement or structure in the armature winding to respond in the event of a fault and separate the connections between the winding phases, including at the neutral point.

13 Claims, 3 Drawing Sheets

FAIL-SAFE MECHANISM FOR DC-DRIVE

FIELD OF THE INVENTION

The present invention is directed to a brushless d.c. drive.

BACKGROUND INFORMATION

Brushless permanent-field d.c. drives may be used in motor vehicles for a variety of purposes, including electric power-assisted steering. These d.c. drives have a synchronous motor, which may have a star-connected stator winding or armature winding and a permanent-field rotor. The armature winding is connected to the direct voltage network by a converter in a bridge circuit having six semiconductor power breakers. The power inverter which causes commutation of the armature winding is controlled by an electronic controller. An example of a synchronous motor operated on a direct voltage network is discussed in German Published Patent Application No. 37 09 168.

If faults occur in the armature winding and/or in the power breakers, the d.c. drive may generate a permanent electromagnetic braking torque without a direct voltage being applied, if the synchronous motor operates as a generator against a low-resistance load impedance. In at least some applications, such a braking torque may have a negative effect on the functioning of the unit or system in which the d.c. drive is used. For example, in the case of electric power-assisted steering systems, the braking torque which occurs in the event of a fault may necessitate a considerable steering force being applied by the driver, which may be unacceptable. Accordingly, devices can be provided on such a d.c. drive to lead to a fail-silent response of the d.c. drive in the event of a fault, i.e., the d.c. drive does not have any interfering or negative effect on the unit or system, so the latter functions as if the drive were not present.

In an electric power-assisted steering system, a mechanical clutch, by way of which the output shaft of the synchronous motor acts on the steering gears, may be used to produce the desired fail-silent response. In the event of a fault, the clutch is opened to uncouple the motor from the steering system.

SUMMARY OF THE INVENTION

The exemplary brushless d.c. drive according to the present invention may have the advantage that the desired fail-silent response of the d.c. drive is achieved without any expensive external components, such as mechanical clutches, with simple circuitry measures in the drive itself. Thus, the d.c. drive becomes more compact and requires less space, so that it can be used in a more versatile manner. The additional cost incurred for the desired response of the d.c. drive in the event of a fault may be greatly reduced.

According to an exemplary embodiment of the present invention, the separating apparatus, arrangement or structure for separating the connections between the winding phases of the armature winding may be activated by a control unit which detects a fault case.

According to another exemplary embodiment of the present invention, the control unit has, for this purpose, measurement shunts in each connecting line between the armature winding and the switching device designed as a bridge circuit having semiconductor switches. In simultaneous blocking phases of all semiconductor switches, the electric currents flowing through the measurement shunts are measured, and in the event of a current value which differs significantly from zero in one of the measurement shunts, the control device delivers an activation signal to the separating apparatus, arrangement or structure. Such a design of the control unit with which faults occurring in the switching device are detected may have the advantage that the measurement shunts already present in the d.c. drive for measuring the current for other reasons can also be used to detect the fault case, thus further reducing the complexity of the circuitry. Faults in the armature winding itself can be detected, for example, by measuring the braking torque delivered to the output shaft of the synchronous motor. This may be an advantage in the case of electric power-assisted steering systems, since sensors for measuring torques on the input and output shafts are already provided in the final control elements of the electric steering devices.

According to yet another exemplary embodiment of the present invention, the control unit in a star connection of the armature winding includes measurement shunts, each connecting a winding phase of the armature winding to the neutral point. The control unit continuously measures the amount and phase of currents flowing through the measurement shunts and adds the shunt currents as vectors. In the event of a significant deviation in the result of this addition from zero, the control unit delivers an activation signal to the separating means. With such a control unit, faults in the semiconductor switching device as well as faults in the armature winding may be detected, and the separating apparatus, arrangement or structure is activated accordingly.

According to other exemplary embodiments of the present invention, the separating apparatus, arrangement or structure may cause a reversible or irreversible separation of the connections between the winding phases of the armature winding. An irreversible separation can be brought about by way of pyrotechnic blasting charges or by fusible cutouts. For reversible separation, electric contacts controllable by an electronic or mechanical apparatus, arrangement or structure are used. In the case of armature windings in a star connection, the neutral point is separated, but in the case of armature windings in a delta connection, each winding phase must be separated from the winding terminations.

DETAILED DESCRIPTION

Figure 1:
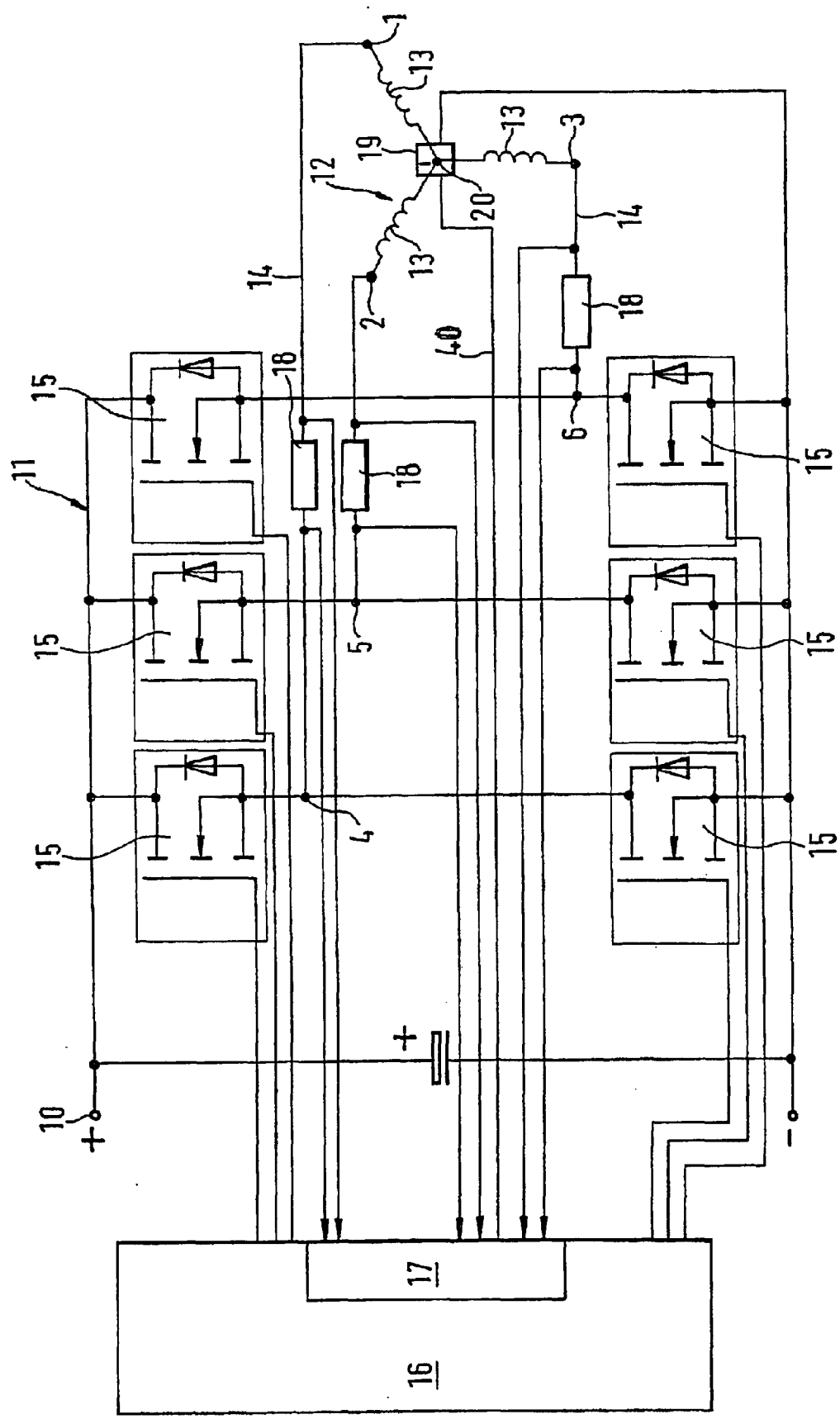
FIG. 1 shows a circuit diagram of a brushless d.c. drive.

The brushless d.c. drive illustrated in FIG. 1 includes a synchronous motor operated by a switching device 11 for electronic commutation on a direct voltage source 10. The synchronous motor, shown here with only its stator winding or armature winding 12, has a stator which holds armature winding 12 and a rotor which rotates in the stator and has permanent magnetic poles. Armature winding 12, which is designed in three phases, has three star-connected winding phases 13 in the embodiment illustrated in FIG. 1, their terminations 1, 2 and 3 being connected to switching device 11 by connecting line 14.

Switching device 11, designed as a B6 power inverter, has six semiconductor switches 15, which may be MOS-FETS, arranged in a bridge circuit. Connecting lines 14 leading to winding terminations 1, 2 and 3 are each connected to taps 4, 5 and 6 of a bridge branch formed by a series connection of two semiconductor switches 15, which is in the connection of two semiconductor switches 15. For commutation of armature winding 12, i.e., for applying winding phases 13 to direct voltage source 10 in the correct order, semiconductor switches 15 can be controlled by an electronic controller 16.

The brushless d.c. drive has a device for forcing a fail-safe silent response, which should ensure that in the event of a fault in the d.c. drive, possibly caused by a defective semiconductor switch 15 or by a winding termination in armature winding 12, this does not interfere with or have a negative effect on the system working with the d.c. drive. This device includes separating apparatus, arrangement or structure which, in the event of a fault, separate the connections between winding phases 13 and a control unit 17, which is integrated into controller 16 and, in the event of a fault, detects the fault case and activates the separating means. In the exemplary embodiment according to FIG. 1, three measurement shunts 18 belong to control unit 17, one being connected to each of three connecting lines 14 between switching device 11 and armature winding 12.

In time intervals during which all semiconductor switches 15 are blocked, control unit 17 measures the shunt currents flowing over measurement shunts 18. If all semiconductor switches 15 are intact, each shunt current is zero. If control unit 17 measures a value which differs significantly from zero in one of measurement shunts 18, it generates an activation signal which is delivered to the separating apparatus, arrangement or structure and activates it.

In the embodiment according to FIG. 1, the separating apparatus, arrangement or structure acts on neutral point 20 of armature winding 12, causing an irreversible separation of the neutral point connection of winding phases 13 when activated. The separating apparatus, arrangement or structure may be, for example, a pyrotechnic blasting capsule 19, such as that used in motor vehicles to deploy airbags in the event of a crash. Electrically ignitable blasting capsule 19 is connected first to control unit 17 by way of a connecting line 40 and second to the negative potential of direct voltage source 10. If one of measurement shunts 18 delivers a current value differing significantly from zero, control unit 17 generates an electric firing pulse which ignites blasting capsule 19. The exploding blasting charge ruptures neutral point 20, thus separating winding phases 13 from one another. In this way, the in-system d.c. drive, which is driven by the system by way of its output shaft in the event of a fault, cannot generate a braking torque because separated armature winding 12 does not allow generator operation.

Figure 3:
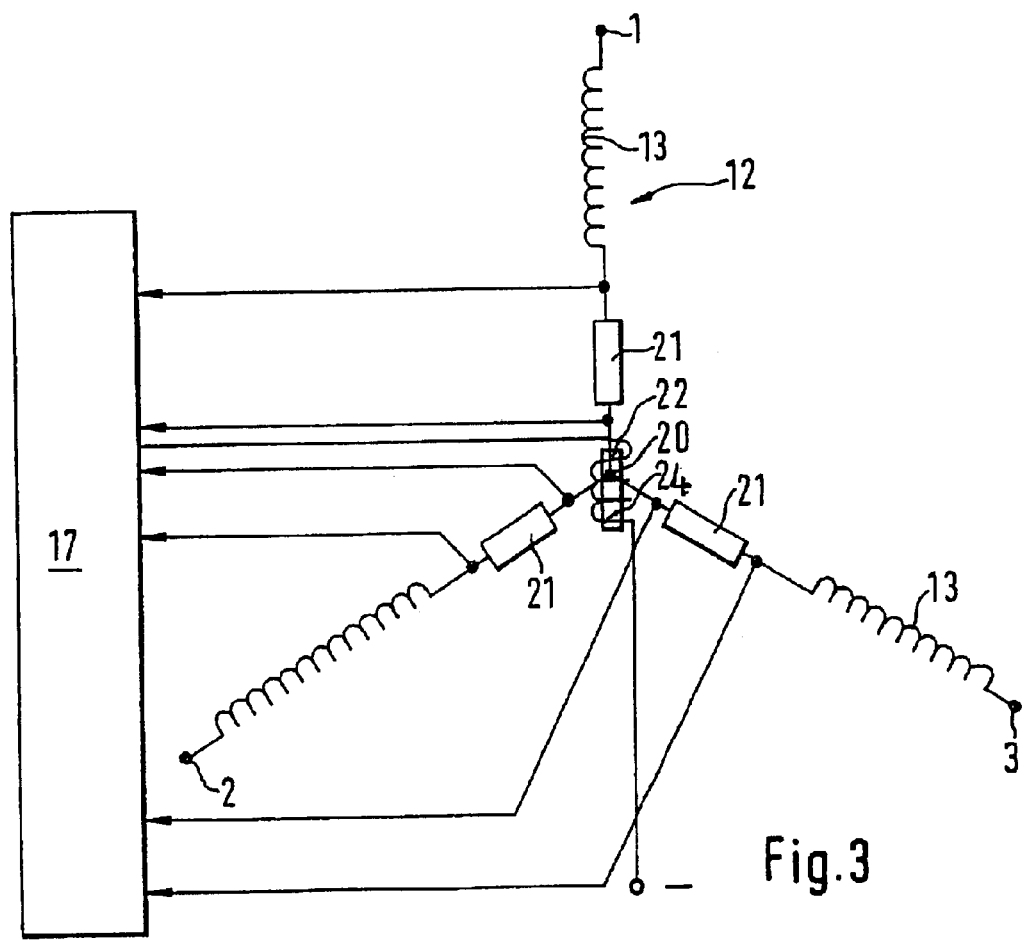
FIG. 3 shows a circuit diagram of the armature winding of the d.c. drive in FIG. 1, having a modified control unit for controlling separating apparatus, arrangement or structure for separating the armature winding.

With control unit 17 described in conjunction with FIG. 1, only faults based on defects in semiconductor switches 15 can be detected. To also detect possible faults occurring in armature winding 12, control unit 17 according to FIG. 3 is modified so that measurement shunts 18 present in feeder lines 14 are eliminated, and, instead, measurement shunts 21 are arranged between neutral point 20 and each winding phase 13. Control unit 17 measures the amount and phase of electric currents flowing over measurement shunts 21 and adds them as vectors. In a fault-free d.c. motor, the result of this addition is always zero. If the vector sum differs significantly from zero, control unit 17 in turn generates an activation signal for the separating apparatus, arrangement or structure, which also act on neutral point 20. In the exemplary embodiment illustrated in FIG. 3, the separating apparatus, arrangement or structure includes a fusible cutout 22 which is heated briefly on activation by control unit 17 so that it melts through and thus separates neutral point 20. A heater coil 24 connected to direct voltage source 10 by way of a power breaker controlled by control unit 17 is-used to heat fusible cutout 22.

Figure 2:
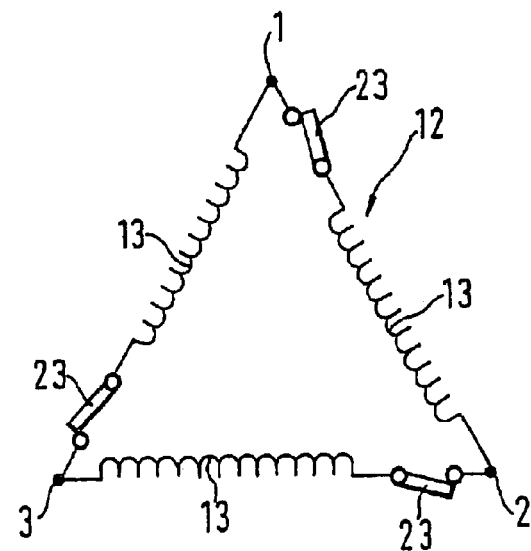
FIG. 2 shows a circuit diagram of a modified armature winding of the d.c. drive in FIG. 1.

Armature winding 12 of the synchronous motor may also be connected in a delta connection, for example, as illustrated in the circuit diagram in FIG. 2. Winding phases 13 are connected to winding terminations 1, 2 and 3. The separating apparatus, arrangement or structure for separating winding phases 13 in the event of a fault is integrated into winding phases 13 and connected in series with them. In the exemplary embodiment in FIG. 2, the response of the separating apparatus, arrangement or structure causes a reversible separation of armature winding 12. To achieve the reversible separation, an electric switching contact 23, which may be controlled by an electronic or mechanical apparatus, arrangement or structure, is arranged between winding terminations 1, 2 and 3 and winding phases 13. Electronically controllable switching contacts 23 are implemented by transistors or thyristors, for example, and mechanically controllable switching contacts 23 may be electromagnetic relays, for example.

Figure 4:
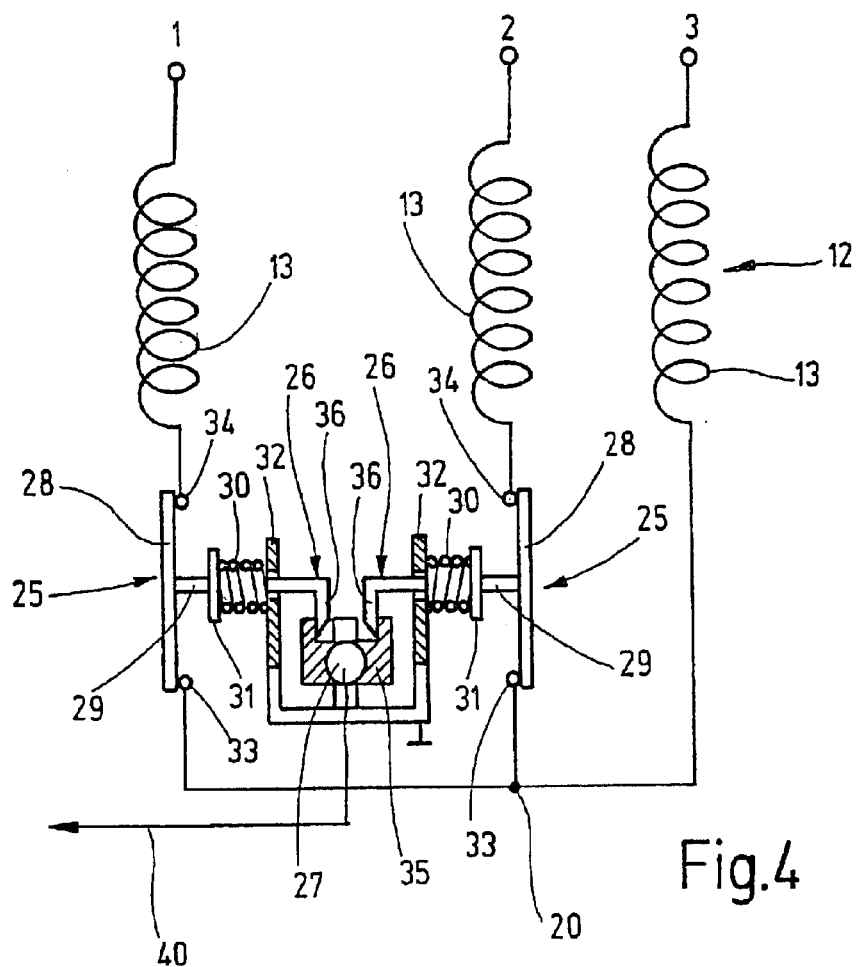
FIG. 4 shows another exemplary embodiment of the circuit diagram of FIG. 2.

In the exemplary embodiment in FIG. 4, like the exemplary embodiment according to FIG. 1, the separating apparatus, arrangement or structure are arranged at neutral point 20 of armature winding 12. When activated, the separating apparatus, arrangement or structure causes an irreversible separation of neutral point 20. The separating apparatus, arrangement or structure includes two switching contacts 25 which are preloaded in the direction of opening and are each held in the closed position by a holding element 26. A switching contact 25 having a holding element 26 is arranged between neutral point 20 and the end of the winding of each of two winding phases 13. It is not necessary to provide a third switching contact having a holding element between neutral point 20 and third winding phase 13. A common electrically ignitable pyrotechnic blasting capsule 27 is provided for both holding elements 26 and is capable of destroying both holding elements 26 when deployed. As in the exemplary embodiment according to FIG. 1, blasting capsule 27 is connected by connecting line 15S 40 to control unit 17 which applies an electric firing pulse to blasting capsule 27 in the event of a fault. With destruction of holding elements 26, prestressed switching contacts 25 are released and opened, so that the connection of two winding phases 13 to neutral point 20 is interrupted suddenly.

FIG. 4 illustrates a structural embodiment for two switching contacts 25 which are prestressed in the direction of opening and have a holding element 26 and a common blasting capsule 27 for holding elements 26. Each switching contact 25 has a contact plate 28 fixedly connected to an operating pin 29. Axially displaceable operating pin 29 is loaded by a compression spring 30 which is supported on a spring plate 31 connected to operating pin 29 and on a stationary stop 32 and prestresses operating pin 29 so that contact plate 28 is lifted up from contact points 33, 34. Both holding elements 26 have a common lock block 35 in which both operating pins 29 engage, each with a locking projection 36 provided on its end which faces away from contact plate 28. When ignited, blasting capsule 27, which is arranged inside lock block 35, destroys lock block 35. In assembly, switching contacts 25 are closed by pressing contact plate 28 against contact points 33, 34 with tensioning of compression springs 30, so that locking projection 36 falls into lock block 35 and is held in place. In the case of a fault, blasting capsule 27 is ignited by control unit 17. This destroys lock block 35, thus releasing operating pins 29, and prestressed compression springs 30 lift contact plates 28 away from contact points 33, 34.

Figure 5:
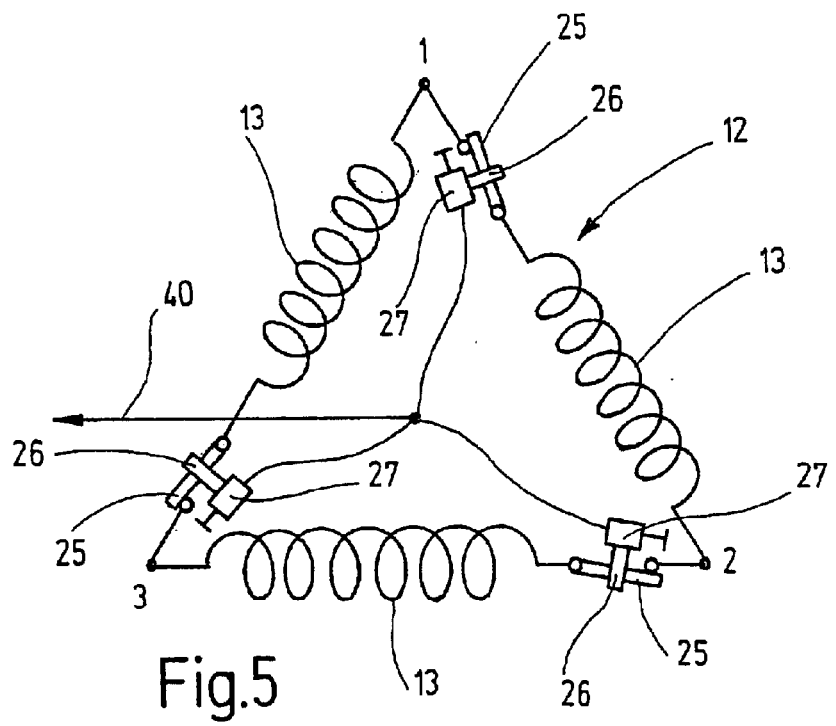
FIG. 5 shows another exemplary embodiment of the circuit diagram of FIG. 2.

In the exemplary embodiment according to FIG. 5, as in the exemplary embodiment according to FIG. 2, armature winding is connected in a delta connection. It is necessary in this exemplary embodiment for each branch of the delta connection to be separated in the event of a fault, so that a switching contact 25 having a holding element 26 is connected to each winding phase 13 in series. In exemplary FIG. 5, a separate blasting capsule 27 is provided for each holding element 26, destroying holding element 26 when deployed, so that switching contact 25 which is prestressed in the closing direction opens automatically. A common blasting capsule 27 may also be used to destroy all three holding elements 26. Prestressed switching contacts 25 having holding element 26 may be as described in conjunction with FIG. 4. In the switching contacts 25 as prestressed spring tongues, separate compression springs 30 for opening switching contacts 25 may be omitted.

What is claimed is:

1. A brushless D.C. drive comprising:
   a synchronous motor including a multiphase armature winding;
   a switching device controllable by an electronic controller to commutate the multiphase armature winding, and being connected upstream from the multiphase armature winding; and
   a device to generate a fail-silent response, and including a separating arrangement to respond to a fault by separating connections between winding phases of the multiphase armature winding;
   wherein a control unit is operable to detect the fault and to activate the separating arrangement; and
   wherein the separating arrangement is operable to cause an irreversible separation of the connections between the winding phases of the multiphase armature winding.

2. The drive of claim 1, wherein the separating arrangement includes at least one pyrotechnic blasting capsule that is triggerable by the control unit.

3. The drive of claim 2, wherein the multiphase armature winding is in a star connection, and the at least one pyrotechnic blasting capsule is arranged at a neutral point so that it is capable of rupturing the neutral point.

4. The drive of claim 2, wherein the separating arrangement includes switching contacts that are prestressed in a direction of opening and holding elements, the opening and holding elements being operable to secure one of the switching contacts in a closed position, and the at least one blasting capsule is arranged so that it is capable of at least one of destroying and releasing the opening and holding elements.

5. The drive of claim 4, wherein:
   the multiphase armature winding is in a star connection and includes at least two winding phases;
   the switching contacts include the opening and holding elements arranged between a neutral point and an end of a winding of the at least two winding phases; and
   the at least one pyrotechnic blasting capsule is a common blasting capsule for all of the opening and holding elements.

6. The drive of claim 4, wherein:
   the multiphase armature winding is in a delta connection;
   each of the switching contacts includes one of the opening and holding elements connected in series with each of the at least two winding phases; and
   the at least one pyrotechnic blasting capsule includes a plurality of pyrotechnic blasting elements, one for each of the opening and holding elements.

7. The drive of claim 4, wherein:
   the multiphase armature winding is in a delta connection;
   each of the switching contacts includes one of the opening and holding elements and is connected in series with each of the winding phases; and
   the at least one blasting capsule includes a common blasting capsule for all of the opening and holding elements.

8. The drive of claim 1, wherein the separating arrangement includes electric switching contacts arranged in the winding phases that are controllable at least one of electronically and mechanically.

9. A brushless D.C. drive comprising:
   a synchronous motor including a multiphase armature winding;
   a switching device controllable by an electronic controller to commutate the multiphase armature winding, and being connected upstream from the multiphase armature winding; and
   a device to generate a fail-silent response, and including a separating arrangement to respond to a fault by separating connections between winding phases of the multiphase armature winding;
   wherein a control unit is operable to detect the fault and to activate the separating arrangement; and
   wherein the separating arrangement includes at least one fusible cutout that is controllable by the control unit.

10. The drive of claim 9, wherein the multiphase armature winding is in a star connection, and the separating arrangement is arranged at a neutral point.

11. The drive of claim 9, wherein the multiphase armature winding is in a delta connection, and the separating arrangement is connected in series with each of the winding phases.

12. A brushless D.C. drive comprising:
   a synchronous motor including a multiphase armature winding;
   a switching device controllable by an electronic controller to commutate the multiphase armature winding, and being connected upstream from the multiphase armature winding; and
   a device to generate a fail-silent response, and including a separating arrangement to respond to a fault by separating connections between winding phases of the multiphase armature winding;
   wherein a control unit is operable to detect the fault and to activate the separating arrangement; and
   wherein:
      the switching device includes semiconductor switches in a bridge circuit;
      the control unit includes measurement shunts arranged in each connecting line between the switching device and the multiphase armature winding; and
      the control unit is operable to measure electric current flowing through the measurement shunts in simultaneous blocking phases of all the semiconductor switches, and to deliver an activation signal to the separation arrangement if a current value in at least one of the measurement shunts differs significantly from zero.

13. A brushless D.C. drive comprising:

a synchronous motor including a multiphase armature winding;

a switching device controllable by an electronic controller to commutate the multiphase armature winding, and being connected upstream from the multiphase armature winding; and a device to generate a fail-silent response, and including a separating arrangement to respond to a fault by separating connections between winding phases of the multiphase armature winding;

wherein a control unit is operable to detect the fault and to activate the separating arrangement; and wherein:

the control unit includes measurement shunts, each of which connects one of the winding phases to a neutral point; and the control unit is operable to continuously measure an amount and a phase of shunt currents, add them as a vector sum, and deliver an activation signal to the separation arrangement if the vector sum significantly deviates from zero.

* * * * *